United States Patent
Toki

[11] 3,712,349
[45] Jan. 23, 1973

[54] ROTARY SAW BLADE FOR SAWING MACHINE

[76] Inventor: Kinzo Toki, No. 1-2, 2-chome, Yahiro, Sumida-ku, Tokyo, Japan

[22] Filed: Feb. 4, 1971

[21] Appl. No.: 112,638

[30] Foreign Application Priority Data

April 25, 1970 Japan .................................. 45/40822

[52] U.S. Cl ...................... 83/848, 144/218, 30/388
[51] Int. Cl. ............................................. B27b 33/02
[58] Field of Search ...... 143/133 R, 133 M; 144/218, 144/223, 239

[56] References Cited

UNITED STATES PATENTS

| 165,152 | 7/1875 | Brown et al .................. 143/133 R X |
| 2,645,010 | 7/1953 | Holmes ......................... 143/133 R X |
| 2,845,102 | 7/1958 | Woodell ........................ 143/133 R X |

FOREIGN PATENTS OR APPLICATIONS

| 5,881 | 4/1891 | Great Britain ......................... 143/133 |
| 3,820 | 11/1874 | Great Britain ......................... 143/133 |
| 887,701 | 8/1953 | Germany .............................. 143/133 |

*Primary Examiner*—Andrew R. Juhasz
*Assistant Examiner*—James F. Coan
*Attorney*—Ernest A. Greenside

[57] ABSTRACT

A rotary saw blade for sawing machine is formed into substantially rhomboidal shape providing symmetrically saw teeth of different pitches at confronted diagonal ends and two guide edges at diagonally opposite corners of confronted sides. A series of teeth provided at one diagonal end are somewhat arched to one direction while series of the teeth provided at the other diagonal end are somewhat arched to the counter direction.

4 Claims, 2 Drawing Figures

PATENTED JAN 23 1973 3,712,349

INVENTOR
KINZO TOKI

ROTARY SAW BLADE FOR SAWING MACHINE

BACKGROUND OF THE INVENTION

This invention relates to a rotary saw blade for sawing machine.

Heretofore, the known circular saw has been used as a rotary saw blade for sawing machine. The circular saw of this type has zigzag teeth which require a highly skilled sharpening technique. Accordingly, when the teeth are damaged or worn-out on or after the sawing operation among bushes, fields, plains and the other out-door places, the sharpening of the teeth is inconvenient or rather difficult as the case.

To avoid the above inconveniency and difficulty, the operator usually carries a number of spare circular saws for purpose of substitution with the worn-out or damaged circular saws suffering inconvenient carriage.

Moreover, the conventional circular saw has poor sawing capacity in proportion to its tooth numbers and is instable under the influence of the centrifugal force generated by the sawing operation entailing hazardous condition for the operator.

SUMMARY OF THE INVENTION

It is therefore a general object of the invention to obviate the above inconveniencies and drawbacks and to provide a new rotary blade for sawing machine which is convenient for operation with improved sawing capacity.

In accordance with the present invention, the rotary saw blade is formed into substantially rhomboidal shape providing symmetrically saw teeth of different pitches at confronted diagonal ends and two guide edges at diagonally opposite corners of the confronted sides.

The saw blade of substantially rhomboidal shape is formed in such a way that at first an outer circle is drawn around a center of the blade base plate of rectangular form, then a first radius across one corner portion of the blade base plate is drawn around a first eccentric center displaced a predetermined distance from the center of the rectangular blade base plate and a second radius across the other corner portion of the blade base plate is drawn around a second eccentric center of the same distance as the first eccentric center and along the first and second radiuses two series of teeth are provided symmetrically.

Another object of the invention is to provide a novel rotary saw blade for sawing machine having symmetrical teeth which may be readily sharpened by the operator when necessitated.

A series of teeth provided at one diagonal end of the substantially rhomboidal saw blade according to the invention are somewhat arched to one direction while series of teeth provided at the other diagonal end are arched to the counter direction without employing the conventional zigzag saw blade system.

Other object of the invention will in part be obvious and will in part appear hereinafter.

BRIEF DESCRIPTION OF THE DRAWINGS

In view of the objects described above and other objects that will be described hereinafter, an embodiment according to the present invention will be described with reference to the accompanying drawings in which.

DESCRIPTION OF THE PREFERRED EMBODIMENT

Figures 1, 2:
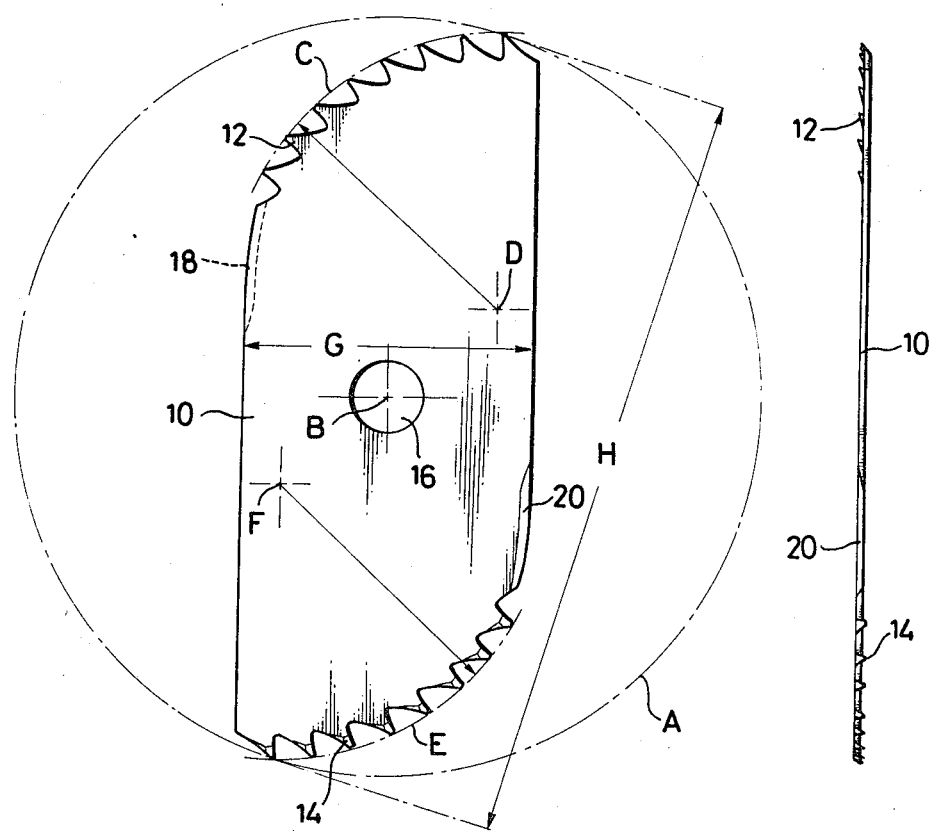
FIG. 1 is a front elevation of the rotary saw blade according to the invention.
FIG. 2 is a side view of FIG. 1.

Now, describing an embodiment according to the present invention with reference to the accompanying drawings, the reference numeral 10 designates a blade base plate of substantially rhomboidal shape which is formed in such a way that at first a circle A is drawn around the center B of the blade base plate 10 of rectangular form, then a radius C across one corner portion of the blade base plate is drawn around an eccentric center D displaced a predetermined distance from the center B and finally a radius E across the other corner portion of the blade base plate is drawn around an eccentric center F of the same distance as the eccentric center D and along the radiuses C and E teeth 12 and 14 are symmetrically formed as best shown in FIG. 1.

The teeth 12 and 14 of different pitches are somewhat arched to the counter directions with one another as best shown in FIG. 2 without utilizing the zigzag saw system as employed in the circular saw.

The blade base plate 10 at its center B is provided with a fitting hole 16 for securing the blade to the driving shaft (not shown).

Further, the blade base plate 10 at its diagonally opposite side corners are provided guide edges 18 and 20 for facilitating smooth sawing operation with high sawing capacity.

According to the invention, the width G to the length H of the blade base plate is remarkably reduced and the total area of the blade base plate has been decreased to at least less than one three of the circular saw with reduction of the material and conveniency for carriage.

The teeth as arched to the same direction ensures a ready sharpening operation by the operator.

Moreover, the centrifugal force to be generated by the rotation of the saw blade according to the present invention is negligible ensuring a stable sawing operation.

The preferred embodiment of the invention has been illustrated and described, but changes and modifications can be made and some features can be used in different combinations without departing from the invention as defined in the claims.

I claim:

1. A rotary saw blade comprising a blade base plate having a substantially rhomboidal shape and being formed with a substantially centered opening in said base plate of rhomboidal shape defined by parallel side walls joined at their opposite contiguous ends by a series of saw teeth whose outer extremities lie along first and second arcs prescribed by first and second radii whose centers are on opposite sides of said opening and equally spaced from the center thereof, the outermost of said series of saw teeth measured from the center of said opening in the base plate being at diagonal ends of the base plate, said diagonal ends being the ends of a diameter of a circle whose radius is greater than said first and second radii.

2. A blade according to claim 1, wherein said saw teeth in said series are of different pitches.

3. A blade according to claim 2, wherein the series of teeth at one end of the blade are laterally arched in one direction and the series of teeth at the opposite end of the blade are laterally arched in an opposite direction.

4. A blade according to claim 3, wherein guide edges are provided adjacent each end of said series of teeth closest to said opening in said base plate.

* * * * *